United States Patent [19]

Ruff

[11] Patent Number: 4,941,902
[45] Date of Patent: Jul. 17, 1990

[54] ICE MAKER AND WATER PURIFIER

[75] Inventor: John D. Ruff, Alexandria, Va.

[73] Assignee: Thermadyne, Inc., Alexandria, Va.

[21] Appl. No.: 437,161

[22] Filed: Nov. 16, 1989

Related U.S. Application Data

[62] Division of Ser. No. 278,447, Dec. 1, 1988, Pat. No. 4,897,099.

[51] Int. Cl.⁵ .............................................. C02F 1/22
[52] U.S. Cl. ................................................ 62/532
[58] Field of Search .......................... 62/123, 124, 532

[56] References Cited

U.S. PATENT DOCUMENTS

| | | | |
|---|---|---|---|
| 2,066,431 | 1/1937 | Taylor | 62/123 |
| 2,691,275 | 10/1954 | Andrews | 62/123 X |
| 2,775,100 | 12/1956 | Howe | 62/123 X |
| 3,398,805 | 8/1968 | Waller | 141/83 X |
| 3,488,974 | 1/1970 | Lunde et al. | 62/123 X |
| 3,885,937 | 5/1975 | Norris | 62/137 |
| 4,262,489 | 4/1981 | Sakamoto | 62/124 |
| 4,370,865 | 2/1983 | Hebino et al. | 62/124 |

Primary Examiner—William E. Tapolcai
Attorney, Agent, or Firm—Epstein, Edell & Retzer

[57] ABSTRACT

Purified ice pieces of a size suitable for use in drinks, and purified liquid water, are derived from unpurified liquid water by directing a stream of the unpurified water over areas of at least one freezing surface. As ice forms at the freezing surface, impurities in the water are washed away by the stream which may be collected so that the unpurified water may be recirculated as part of the freezing process. The freezing surface areas are periodically heated to detach the ice, the detached ice being collected in a bin. Ice at the bottom of the bin is melted by selectively heating the bin to provide purified water that is collected in a container. Controls are provided to automatically initiate bin heating and thereby maintain a predetermined amount of purified liquid water in the container.

9 Claims, 4 Drawing Sheets

ICE MAKER AND WATER PURIFIER

This application is a divisional application of application Ser. No. 278,447 filed Dec. 1, 1988, now U.S. Pat. No. 4,897,099.

BACKGROUND OF THE INVENTION

1. Technical Field

The present invention relates to a method and apparatus for providing purified ice pieces and purified liquid water from a source of unpurified liquid water. More particularly, the present invention relates to a method and apparatus for producing and maintaining predetermined amounts of purified ice and purified liquid water in a common appliance housing.

2. Discussion of the Prior Art

In recent years there has been considerable public concern about the poor quality of tap water. Excessive chlorination, contamination by pesticides, and a variety of other factors have contributed to this concern. As a consequence, sales of bottled water and faucet filters have increased dramatically. Over the long run both of these solutions are expensive. It is desirable, therefore, to provide a low cost alternative to providing purified drinking water for the home and workplace. An attempt to provide purified water for household use by means of a freezing technique is disclosed in U.S. Pat. No. 3,338,065 (Ashley). In that patent there is a disclosure of an elongated freezing element disposed at the bottom of a tank of unpurified water. Water adjacent the surface of the freezing element freezes on that surface and accumulates as an ice mass until the freezing element is defrosted. The ice mass is released from the defrosted freezer element and floats to the top of the tank where it melts. Without stating how, the patent presumes that the formed ice mass is free of impurities present in the unpurified water; however, experience dictates that this modified static freezing approach does not significantly eliminate entrapment of impurities in the formed ice mass. The Ashley patent also states that the released ice mass is "washed" by the body of water as the mass floats upwardly in the tank toward the surface; however, this "washing" action, at best, removes impurities only from the surface and does not remove impurities trapped in the ice mass. The liquid at the top of the tank, where the ice masses melt, is described in the patent as being purified and, since it is less dense than the unpurified water in the tank, remains at the top of the tank without significantly mixing with the unpurified water. Water from the top of the tank may then be withdrawn for consumption. To the extent that this process purifies water, it is believed that the purification is minimal.

Similarly, the sale of purified ice cubes has increased significantly because of concern over impurities in ice cubes formed from unpurified tap water. Typically, when ice is made from tap water, the water is poured from the tap into compartments of trays where the water remains stationary as it freezes. This static process of freezing tap water whole, or in bulk, results in all of the original tap water impurities, including dissolved gasses, remaining trapped in the ice cubes. In other words, the impurities are not chemically dissolved in the frozen water; rather, they are mechanically trapped in the resulting solidified ice cube structure. The resulting cubes are cloudy, as opposed to the clear appearance of purified ice, and are porous such that they tend to absorb odors from the refrigerator and freezer. Even if those commercial refrigerator-freezers that have a built-in automatic icemaking feature, the original water source is tap water, and the tap water is frozen in bulk. Consequently, the resulting ice cubes contain the trapped tap water impurities and are also porous in texture.

It is known in the prior art that unpurified liquid water may be issued forcibly against a surface that is cold enough to cause progressive accumulation of a mass of ice thereon. The stream of water, flowing over the growing ice mass, washes away impurities in the water before the impurities can be trapped in the ice mass. Systems using this flowing or dynamic freezing technique are disclosed in U.S. Pat. Nos. 2,341,721 (Whitney), and 3,170,779 (Karnofsky). Generally, these systems are directed to large scale freezing and purifying operations that are not suitable for producing relatively small ice pieces (i.e., pieces the size of ice cubes as used in drinks). If the known dynamic freezing process were employed in a household refrigerator, therefore, it would be necessary to break the resulting ice mass into small pieces suitable for use in drinks; the prior art does not address the problem. Further, the dynamic freezing technique has generally required an ice making machine made specifically for that purpose and not as an adaption to a household refrigerator. A separate icemaking machine using the dynamic freezing process would be expensive and not practical for most consumer applications.

SUMMARY OF THE INVENTION

In accordance with the present invention, the abovedescribed dynamic freezing technique is employed in a manner to form multiple individual purified ice pieces. This ice is periodically collected in a bin, the bottom of which is selectively heated to melt the ice and obtain purified liquid water that is drained off into a separate container from which it may be dispensed. By combining both ice making and purified liquid water formation in the same unit, the resulting cost of the unit becomes feasible as compared to the continuing cost of purchasing purified ice and purified liquid water on a retail basis. Heating of the ice bin is automatically controlled to maintain the desired amount of purified liquid water in the container. Similarly, a refrigerant vapor compression system, employed to provide cooling for ice formation, is automatically controlled to maintain a prescribed amount of ice in the bin and to operate in synchronism with bin heating for melting the ice.

The dynamic freezing technique is adapted to form ice by passing a stream of unpurified water over one surface of a plate at which selected areas are cooled to below the freezing temperature of water by contacting the opposite surface of the plate with respective sections of evaporator tubing. Periodic heating of the selected areas permits the accumulated ice to detach from the plate and be collected in the bin.

BRIEF DESCRIPTION OF THE DRAWINGS

These and other objects, features and many of the attendant advantages of the present invention will be appreciated more readily as they become better understood from a reading of the following description considered in connection with the accompanying drawings wherein like parts in each of the several figures are identified by the same reference characters, and wherein.

DESCRIPTION OF THE PREFERRED EMBODIMENTS

Figure 1:
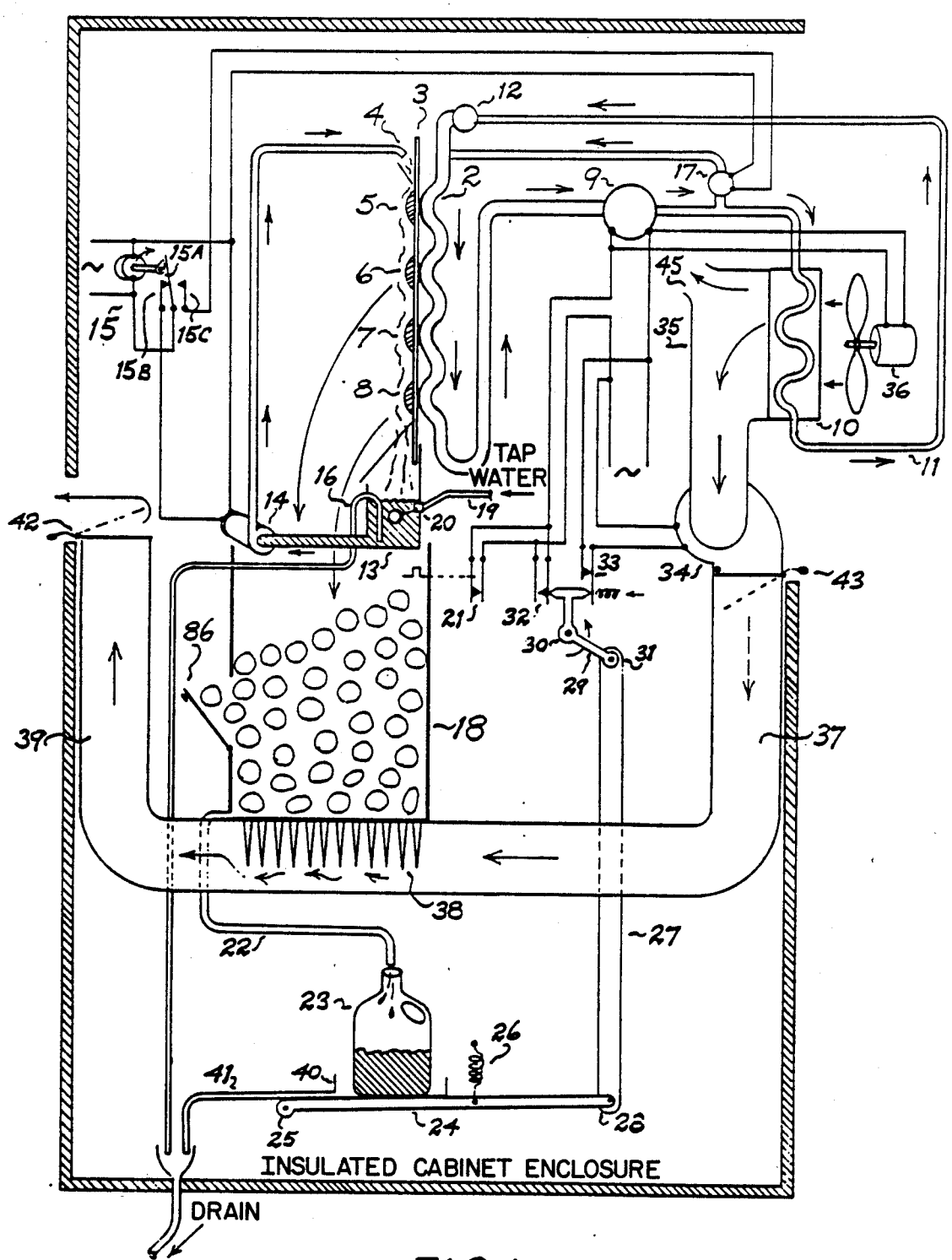
FIG. 1 is a schematic flow diagram of a system constituting one embodiment of the present invention.

Referring to FIG. 1 of the accompanying drawings, an ice maker includes an evaporator tube 2 contacting the dry or control surface of a vertical ice-forming plate 3 at multiple spaced points. For some applications a plurality of such plates may be employed. Unpurified water discharged as a jet or stream from nozzle 4 flows down the wet or ice-forming surface of plate 3, whereby ice pieces 5, 6, 7 and 8 are formed at spaced areas corresponding to the locations of contact between evaporator tube 2 and plate 3. Refrigerant vapor from the evaporator flows back to a compressor 9 where it is compressed and then flows to an air-cooled condenser 10. Condensed liquid refrigerant flows via liquid line 11 to a metering device 12, typically an expansion valve, then back to evaporator 2 in a conventional closed circuit refrigeration flow path. Excess water flowing over the growing ice pieces 5, 6, 7 and 8 carries away impurities before they can be trapped and then drains into sump 13. Water from sump 13 is drawn by pump 14 and pumped back to nozzle 4 to form a continuous circuit of unpurified water flow.

After a predetermined time has elapsed for ice pieces 5, 6, 7 and 8 to grow to adequate size, a harvest of the ice pieces is initiated. A cam 15a of a timer 15 actuates switch points 15b to break an energizing circuit for pump 14. With pump 14 de-actuated, water in transit from pump 14 to nozzle 4, and water flowing over the ice pieces, flows back to raise the level in sump 13. This activates a siphon 16 which then dumps the remainder of the water from sump 13 to the drain. At the same time, timer 15 activates switch point 15b to deactivate pump 14, and activates switch point 15c to energize a hot gas valve 17, allowing hot refrigerant gas to be shunted around the condenser and expansion valve and flow directly into evaporator 2. The warming effect of this hot gas detaches the ice pieces from plate 3 and permitting the pieces to fall into ice bin 18. Meanwhile, the water in sump 13 is replenished by tap water from pipe 19 under the control of a float valve 20. After a predetermined ice piece harvest interval, cam 15a of timer 15 reverses the settings of the switch points, de-energizes hot gas valve 17, and reactivates pump 14 so that ice making can be resumed. A repetitive cycle of harvest and ice making is thus continued until ice bin 18 is full, at which time the ice pieces come into contact with the ice quantity sensor of bin switch 21 which opens, causing compressor 9 to be de-actuated. The ice pieces thusly collected, because they are continuously washed by the stream evacuating from nozzle 4 as they are being formed, have a much higher purity then that of the original tap water. The ice-making apparatus so far described is of a type commonly used and well known. Similarly, any other type of icemaker using a recirculating flow of pumped water, and thus being capable of producing a supply of pure ice pieces, can be used in this invention.

Any ice which melts in bin 18 drains through a pipe 22, having its inlet at the bottom of the bin, into a bottle 23 or other container which rests on a platform 24 hinged at a positionally fixed point 25. By "positionally fixed" it is meant that the hinge or pivot point 25 is stationary relative to the common cabinet or housing for all of the components described herein. If bottle 23 is less than full, its weight is overcome by the resilient bias force of a balance spring 26 which pulls platform 24 counter-clockwise (as viewed in the drawing) to swing the platform upwardly. This upward movement causes an upward movement of control link 27 connected to platform 24 at connecting pivot 28, the latter being movable relative to the common system housing. Upward movement of control link 27 causes counter-clockwise rotation of a rocker arm 29 about a fixed pivot point 30 to which it is connected at a movable pivot point 31. The rotation of rocker arm 29 causes an override switch 32 to close, thereby bypassing bin switch 21 and permitting compressor 9 to run regardless of the state of the bin switch. Rotation of rocker arm 29 also permits switch 33 to close and thus activate a melting fan 34 which draws air from a plenum 35. A condenser fan 36 forces ambient air about the outside of condenser 10, where the air is warmed, and then into the plenum 35. Fan 34 forces this warm air to flow through a duct 37, over heat exchange fins 38 or other surfaces in duct 37 in contact with the underside of bin 18, and then through discharge duct 39 back to the ambient environment. Ice resting on the bottom of bin 18 is thus melted at a relatively fast rate and the resulting water is drained via pipe 22 into bottle container 23.

As ice melts at the bottom of the bin, the weight of the ice pieces in the bin causes more ice pieces to continually move downwardly to the bin bottom. Meanwhile, the ice-making function continues so that a supply of fresh ice pieces is collected in the bin. When container 23 is full, its weight overcomes the bias force of balance spring 26 and causes platform 24 to drop (i.e., pivot clockwise about fixed pivot 25). Control link 27 is thereby pulled downwardly, rotating rocker arm 29 clockwise to open switch 33 and shut off melting fan 34. Override switch 32 also opens and leaves control of ice making to bin switch 21. With melting fan 34 shut down, melting of ice pieces at the bottom of the bin ceases. However, after some hours without withdrawal of water from container 23, some slight additional unintended melting of ice occurs in bin 18 causing a small overflow from container 23. Trough 40 catches this overflow which drains from the system housing through pipe 21 to a drain.

Balance dampers 42 and 43 are forced open by air flow when melting fan 34 is in operation, but are biased to close when the air flow ceases. These dampers prevent inadvertent air drafts through heat exchange fins 38 which would cause undesired melting of the ice pieces. When the ice maker is making ice pieces, but is not in the melting mode (i.e., the melting fan 34 not running), air from condenser fan 36 is forced through condenser 10 into plenum 35 but does not flow through de-actuated fan 34; instead, the air exits plenum 35 through opening 45 and flows back to the ambient environment.

The override switch 32 is employed to cause the ice-making process to be in operation at any time the ice melting function is employed. This is an advantage since ice pieces are needed to replace the ice pieces that are melted. It should be noted, however, that this feature is not essential and a slightly simpler arrangement results if switch 32 is eliminated. Under such circumstances, if melting is started with a full ice bin, ice making is not commenced until the melting function drops the level of ice pieces in the bin 18, at which time the bin switch 21 initiates the ice making process. The melting process without continued ice making process is somewhat slower than with continued ice making since there is no heating effect from condenser 10. However, ambient air flowing into plenum 35 through opening 45 supplements the reduced air flow through condenser 10 without condenser fan 36 running and significant melting does occur, albeit at a slower rate.

Figure 2:
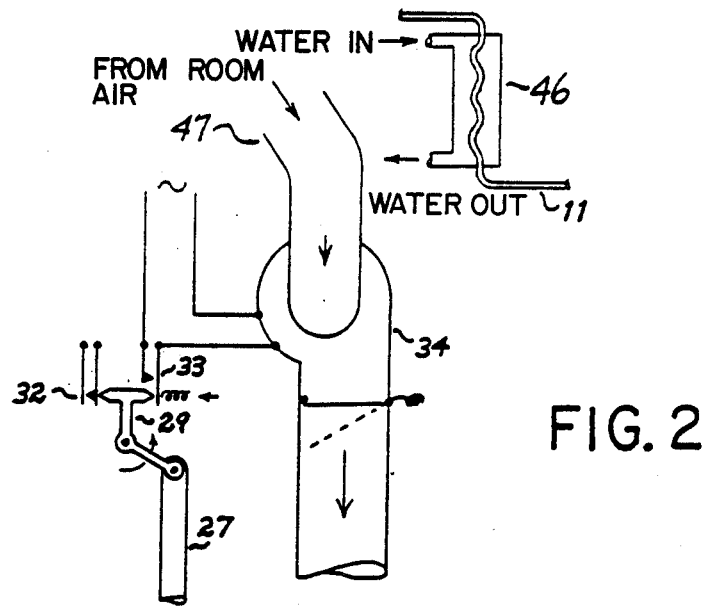
FIG. 2 is a schematic flow diagram of a modified portion of the system of the FIG. 1.

FIG. 2 illustrates a modification in which the air flowing to melting fan 34 is independent of the condenser 46 which, in this modification, can be either a water-cooled or an air-cooled condenser. Ambient air is conducted to fan 34 via duct 47. Ambient air is not quite as warm as condenser-heated air, but in sufficient quantity it accomplishes the melting function.

Figure 3:
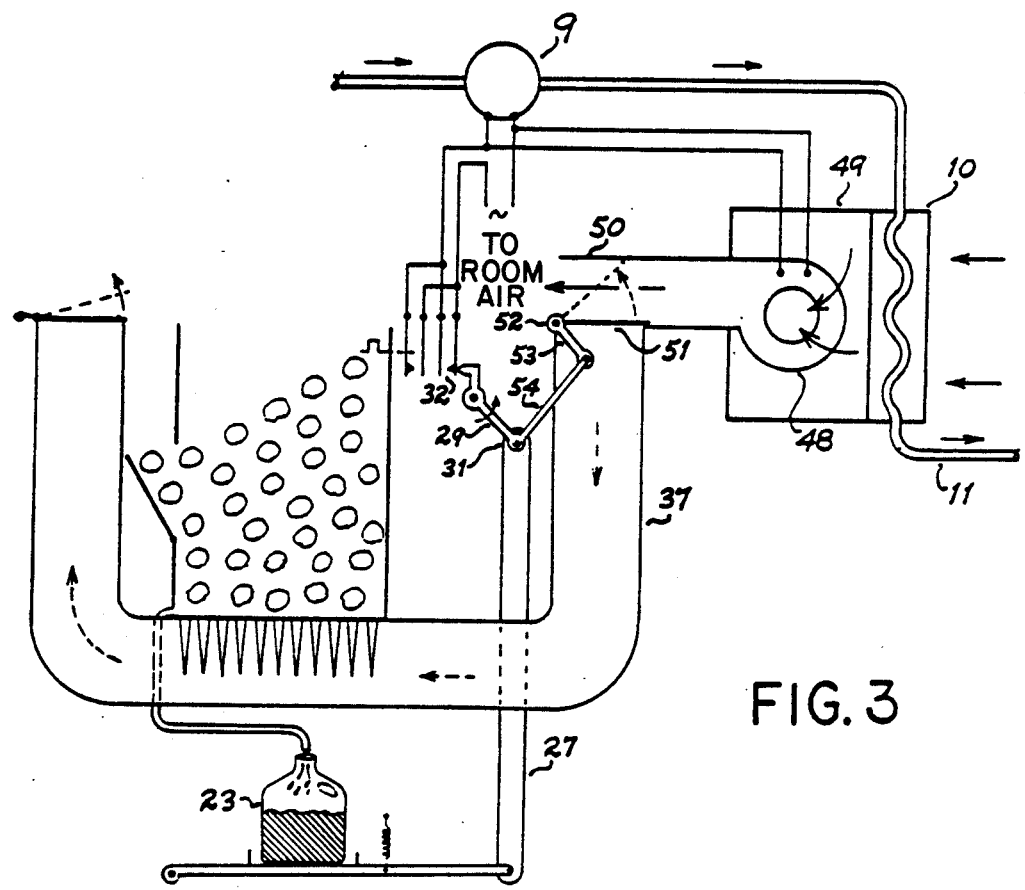
FIG. 3 is a schematic flow diagram of a second embodiment of the system of the present invention.

The embodiment illustrated in FIG. 3 employs a single fan 48 for both the melting and heating functions effected by melting fan 34 and condenser fan 36 of FIG. 1. When an ice making operation is underway, but the melting mode is not activated, fan 48, mounted in plenum 49, draws ambient air through condenser 10 and discharges it back to the ambient environment through duct 50. However, when container 23 is less than full, as already described in relation to FIG. 1, control link 27 is caused to move upwardly to rotate rocker arm 29 counter-clockwise and actuate override switch 32. Diverter damper 51 rotates about fixed pivot 52 under the impetus of a control arm 53 linked by a connecting rod 54 to connecting pivot 31. When rocker arm 29 rotates counter-clockwise, it causes diverter damper 51 to open so that the air discharged from fan 48 flows through duct 37 instead of to the ambient environment. This air flow through duct 37 achieves the melting function in the same manner described in relation to FIG. 1. All other system functions in the FIG. 3 embodiment are the same as described in relation to FIG. 1.

Figure 4:
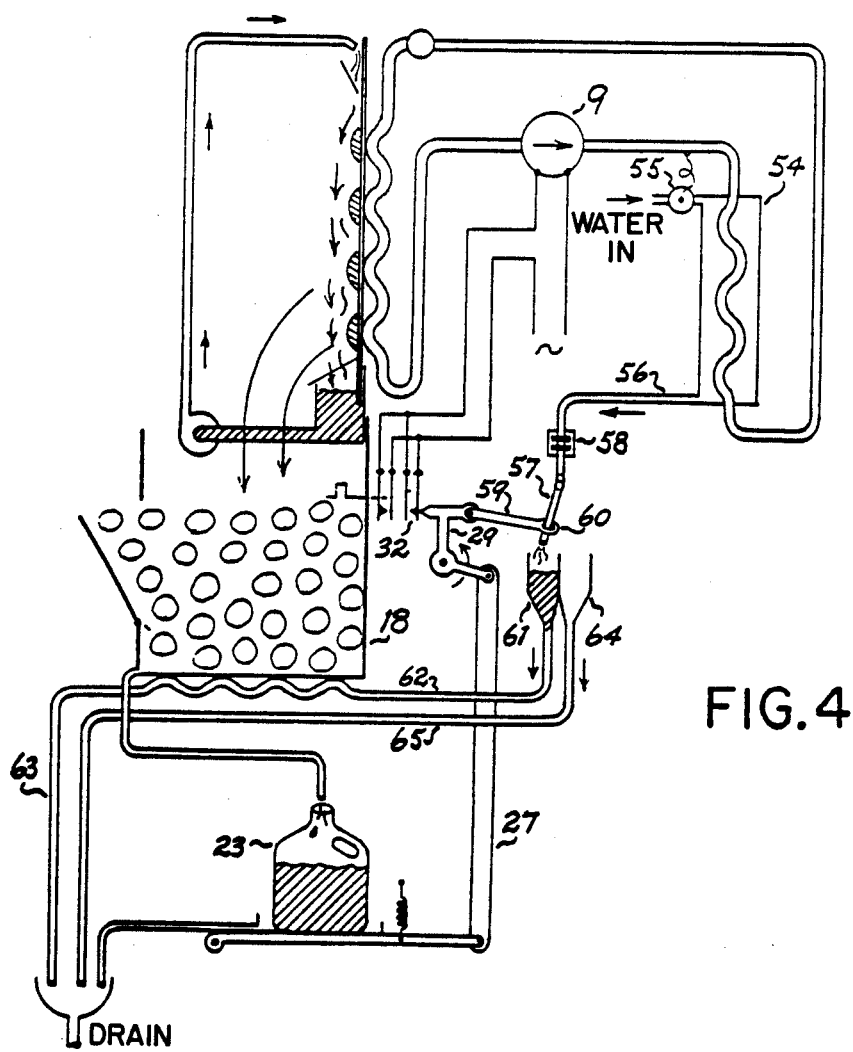
FIG. 4 is a schematic flow diagram of still another embodiment of the system of the present invention.

FIG. 4 illustrates a water cooled embodiment of the invention. The ice making function is the same as in the FIG. 1 embodiment, but the system condenser 54 is water cooled with a water valve 55 controlling water flow. When container 23 is less than full, control link 27 moves upwardly, as previously described, to cause rocker arm 29 to rotate counter-clockwise and actuate override switch 32. Warm water flowing from condenser 54, through pipe 56, flows into flexible tube 57 which is anchored to the housing on block 58. Connected to rocker arm 29 is a link 59 attached to a ring 60 which encircles flexible tube 57, so that when rocker arm 29 rotates to activate override switch 32, the outlet of flexible tube 57 is moved to a position above a sump 61. Warm water thus flows into sump 61 and drains through pipe 62. Pipe 62 makes contact with the bottom of ice bin 18 so that the warm water flow melts ice pieces at the bottom of the bin. Drain pipe 63 discharges the water to the drain. When container 23 is full, its weight causes rocker arm 29 to reverse its rotation so that link 59 pulls the outlet of flexible tube 57 over sump 64. In this position of tube 57 water from the condenser flows into sump 64 and drains directly to the drain via pipe 65, and the melting function is terminated. All other functions in this embodiment are as described above in relation to FIG. 1.

Figure 5:
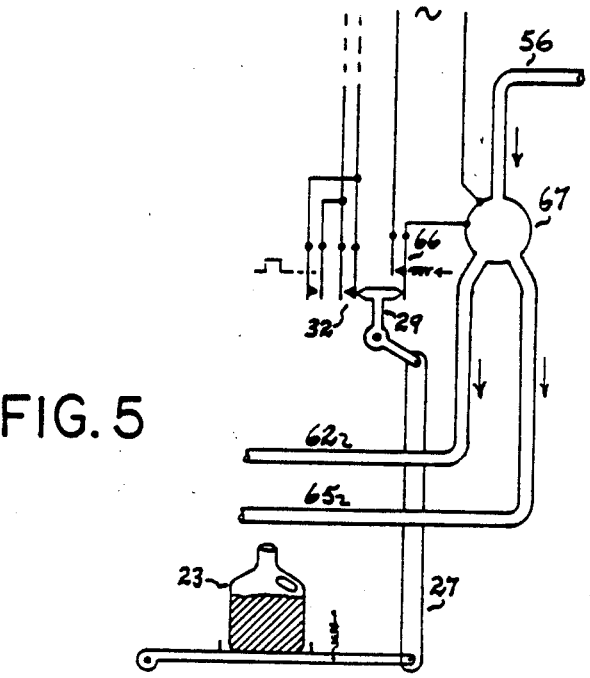
FIG. 5 is a schematic flow diagram of a modified portion of the system illustrated in FIG. 4.

An electrically operated water valve modification is illustrated in FIG. 5. When container 23 is less than full, control link 27 moves upwardly, as described above, causing rocker arm 29 to rotate counter-clockwise. In addition to activating override switch 32, the rocker arm actuates a switch 66 which energizes diverter valve 67. Water from the condenser then flows from pipe 56 through diverter valve 67 to pipe 62 to warm the bottom of ice bin 18 (in the manner described in relation to FIG. 4) and then to the drain. When container 23 is full, rocker arm 29 reverses rotation, opens override switch 32, opens switch 66 and de-energizes diverter valve 67. Then, any warm water received from the condenser drains via pipe 65 directly to the drain, and the melting function is terminated.

Figure 6:
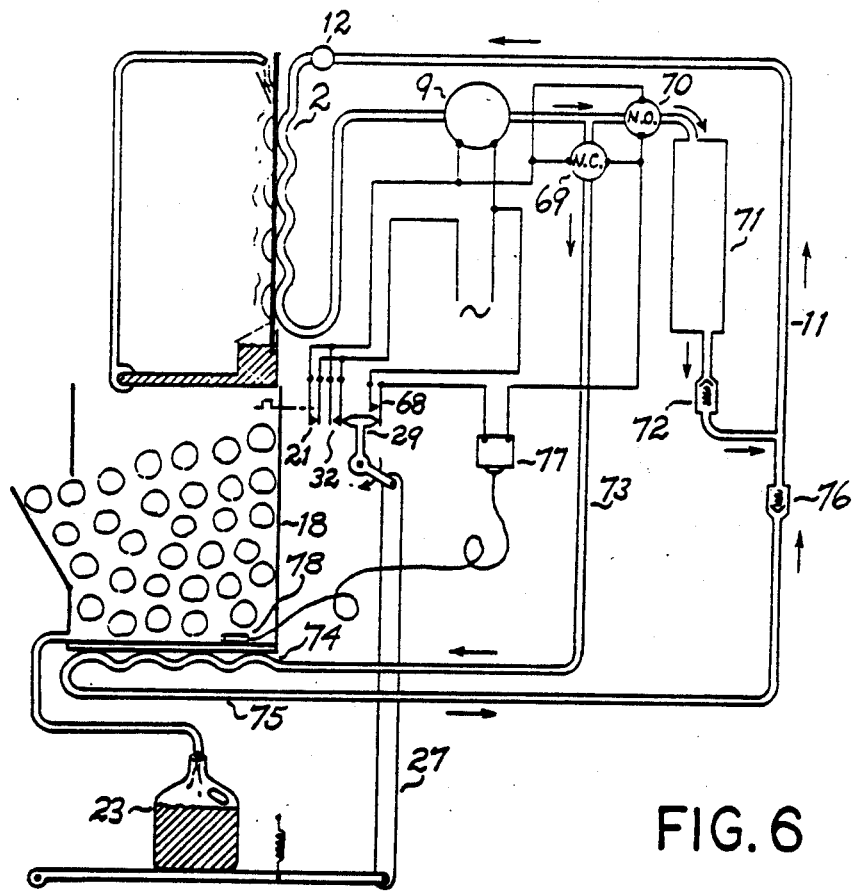
FIG. 6 is a schematic flow diagram of still another system embodiment of the present invention.

The embodiment illustrated in FIG. 6 provides an alternative method of ice melting. With container 23 full, a downward force is exerted on control link 27, causing a clockwise rotation of rocker arm 29 to hold switch 68 open. Current flow to solenoid valves 69 and 70 is interrupted so that these valves remain de-energized. With bin switch 21 closed, indicating that the bin is less than full, compressor 9 continues to run. Solenoid valve 70 is a normally open valve; thus, since it is de-energized, valve 70 permits refrigerant fluid discharged by compressor 9 to flow to condenser 71. Solenoid valve 69 is a normally closed valve; thus, since it is de-energized, it is closed. Condenser 71 may be either air-cooled or water-cooled. Refrigerant liquid flows through check valve 72 to liquid line then to metering device 12 and evaporator 2 in the ice making function previously described in relation to FIG. 1. If some of the water is removed from container 23, control link 27 is caused to move upwardly. Rocker arm 29 then rotates counter-clockwise, override switch 32 is closed, and switch 68 is permitted to close, thereby completing a circuit to energize both solenoid valves 69 and 70. When the normally open solenoid valve 70 is energized, it closes to shut off refrigerant flow to condenser 71. When normally closed solenoid valve 69 is energized, it opens to allow flow of hot refrigerant ga through pipe 73 to coil 74 mounted under ice bin 18. Coil 74 acts as a condenser rejecting heat of condensation to melt ice pieces in ice bin 18. Condensed liquid refrigerant from coil 74 flows through pipe 75 and check valve 76 to liquid line 11. Check valve 72 serves to block backflow into condenser 71. Liquid flow in liquid line 11 continues as part of the ice making function previously described.

Coil 74 is placed so that it is not in metal-to-metal contact with the bottom of ice bin 18; therefore a condensing temperature greater than the ice melting temperature of 32° F. can be maintained. An air gap is provided so that thermal energy transfer can be accomplished by radiation and, to some extent, by convection; alternatively a layer of semi-conducting material, such as plastic, may be used to separate the coil from the ice bin bottom. In this way, the condensing temperature in coil 74 can be maintained at about 110° F., while the melting temperature is around 32° F.; the resulting 78°

F. temperature gradient extends through the separating gap. Thermostat 77, with its sensing bulb 78 on the bottom of ice bin 18, is of the break-on-rise type and senses the presence of ice in the bottom of the bin. With no ice pieces present, the temperature at the bulb rises and breaks a circuit to solenoid valves 69 and 70. This prevents the system from using coil 74 as a condenser when there is no ice in the bin, as this would be an unworkable function.

Figure 7:
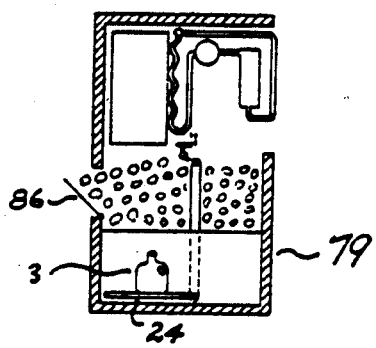
FIG. 7 is a schematic diagram of a modification suitable for use in any of the system embodiments described herein.

The typical procedure for water handling is to use a one gallon plastic water bottle 23 (FIG. 7) which is positioned inside the housing on platform 24 and is usually full. FIG. 7 illustrates how bottle 23 may be kept within the insulated walls 79 of the machine housing or cabinet, thereby assuring that the purified liquid is kept cool for use. When the purified water is to be used, the bottle is taken from the machine and replaced by an empty bottle; alternatively, the original bottle is replaced partially full.

Figure 8:
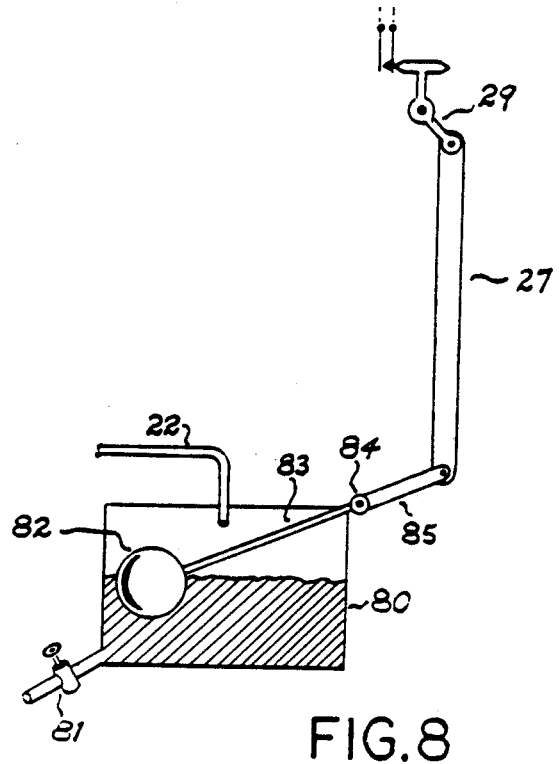
FIG. 8 is a schematic diagram of a modification useful in any of the system embodiments described and illustrated herein.

An alternative water storage arrangement, illustrated in FIG. 8, employs a water tank 80 mounted permanently within the housing or cabinet of the machine. Pipe 22 delivers purified liquid water to the tank 80, and spigot 81 is used to dispense that water as needed. A float 82 on arm 83 rotates about fixed pivot point 84 so as to rise and fall with the water level in tank 80. Extension 85 of arm 83 is connected to control link 27 to activate rocker arm 29 in the manner described above in relation to FIGS. 1, 3, 4, 5 and 6. Tank 80, with float 82, is thus a substitute for bottle 23, platform 24 and balancing spring 26 (FIGS. 1, 3, 4, 5 and 6). A drop in water level in tank 80 causes float 82 to drop, forcing control link 27 to move upwardly in the same manner that the reduction of water in bottle 23 (FIG. 1) causes balance spring 26 to pull platform 24 and control link 27 upwardly.

The ice pieces, of course, may be removed from the bin for use in drinks, or other purposes at any time, via bin door 86.

From the foregoing description it will be appreciated that the invention makes available a novel ice maker and water purifier wherein both small purified ice pieces and purified water are produced and stored for use in a common cabinet or housing.

Having described preferred embodiments of a new and improved ice maker and water purifier in accordance with the present invention, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed:

1. A method for providing a supply of purified ice and a supply of purified liquid water from a source of unpurified liquid water, said method comprising the steps of:
    (a) cooling selected area of at least one ice-forming surface to a temperature below the freezing temperature of water by conducting thermal energy to at least one evaporator passage from said selected areas of said ice-forming surface;
    (b) directing a water stream of the unpurified liquid water over said selected areas to form ice at said selected areas while washing impurities away from the formed ice with said stream;
    (c) increasing the temperature at said selected areas at various times to remove said ice from said ice-forming surface;
    (d) collecting the ice removed in step (c) in a bin;
    (e) warming a portion of said bin at selected times to melt some of the ice therein into purified liquid water;
    (f) collecting in a container the purified liquid water derived in step (e);
    wherein said evaporator passage is part of a continuous refrigerant flow path for refrigerant fluid, said flow path including a compressor, condenser means, a metering device and the evaporator passage, wherein step (a) includes energizing said compressor;
    (g) sensing the amount of collected ice in said bin;
    (h) sensing the amount of collected purified liquid water in said container;
    (i) in response to both the amount of said collected ice in said bin exceeding a first predetermined amount, and the amount of said collected purified liquid water in said container exceeding a second predetermined amount, de-energizing said compressor;
    (j) following step (i), re-energizing said compressor whenever either or both of the following occurs: (1) the amount of collected ice in said bin falls below the first predetermined amount; and (2) the amount of collected purified liquid water in said container falls below the second predetermined amount;
    wherein said condenser means in said refrigerant flow path includes first and second condensers disposed in respective parallel and alternatively conductive first and second path sections, said second condenser being disposed at the underside of said bin to heat collected ice at the bottom of said bin;
    (k) separating said second condenser from the bottom of said bin by a medium having very low heat flow characteristics;
    and wherein step (e) includes the steps of:
        (e.1) in response to the amount of collected purified liquid in said container being less than said second predetermined amount, actuating said second path section to cause heated refrigerant fluid to flow through said second condenser; and
        (e.2) in response to the amount of collected purified liquid in said container exceeding said second predetermined amount, actuating the first path section to cause refrigerant fluid to flow through said first condenser and thereby bypass said second condenser.

2. The method according to claim 1 further comprising the step of sensing the temperature at the bottom inside of the said bin and preventing the flow of heated refrigerant fluid through said second condenser in response to sensed temperatures above ice melting point.

3. The method according to claim 1 wherein step (k) comprises separating said second condenser from the bottom of said bin by an air gap.

4. The method according to claim 1 wherein step (k) comprises separating said second condenser from the bottom of said bin by a non-metallic material.

5. The method according to claim 1 further comprising, as part of step (b), the steps of collecting portions of said water stream that do not form said ice, and recycling the collected portions of said water stream as part of the source of unpurified liquid water.

6. The method according to claim 1 further comprising the step of automatically controlling the various times of warming said portion of said bin in step (e) as a function of the amount of purified liquid water in said container.

7. A method for providing a supply of purified ice and a supply of purified liquid water from a source of unpurified liquid water, said method comprising the steps of:
- (a) cooling selected areas of at least one ice-forming surface to a temperature below the freezing temperature of water by conducting thermal energy to at least one evaporator passage from said selected areas of said ice-forming surface;
- (b) directing a water stream of the unpurified liquid water over said selected areas to form ice at said selected areas while washing impurities away from the formed ice with said stream;
- (c) increasing the temperature at said selected areas at various times to remove said ice from said ice-forming surface;
- (d) collecting the ice removed in step (c) in a bin;
- (e) warming a porting of said bin at selected times to melt some of the ice therein into purified liquid water;
- (f) collecting in a container the purified liquid water derived in step (e);
- wherein said evaporator passage is part of a continuous refrigerant flow path for refrigerant fluid, said flow path including compressor means, a condenser, a metering device and the evaporator passage, wherein step (a) includes energizing said compressor;
- (g) sensing the amount of collected ice in said bin;
- (h) sensing the amount of collected purified liquid water in said container;
- (i) in response to both the amount of said collected ice in said bin exceeding a first predetermined amount, and the amount of said collected purified liquid water in said container exceeding a second predetermined amount, de-energizing said compressor;
- (j) following step (i), re-energizing said compressor whenever either or both of the following occurs; (1) the amount of collected ice in said bin falls below the first predetermined amount; and (2) the amount of collected purified liquid water in said container falls below the second predetermined amount;
- wherein said condenser means in said refrigerant flow path includes first and second condensers disposed in respective parallel and alternatively conductive first and second path sections, said second condenser being disposed at the underside of said bin to heat collected ice at the bottom of said bin;
- wherein step (e) includes the steps of:
  - (e.1) in response to the amount of collected purified liquid in said container being less than said second predetermined amount, actuating said second path section to cause heated refrigerant fluid to flow through said second condenser; and
  - (e.2) in response to the amount of collected purified liquid in said container exceeding said second predetermined amount, actuating the first path section to cause refrigerant fluid to flow through said first condenser and thereby bypass said second condenser; and
- (k) sensing the temperature at the bottom, inside of the said bin and preventing the flow of heated refrigerant fluid through said second condenser in response to sensed temperatures above ice melting point.

8. The method according to claim 7 further comprising, as part of step (b), the steps of collecting portions of said water stream that do not form said ice, and recycling the collected portions of said water stream as part of the source of unpurified liquid water.

9. The method according to claim 7 further comprising the step of automatically controlling the various times of warming said portion of said bin in step (e) as a function of the amount of purified liquid water in said container.

* * * * *